Sept. 11, 1934.  E. McCORMICK ET AL  1,973,575

ROAD BAND

Filed May 13, 1932

INVENTORS
Elmer McCormick and
John O. Cade
BY
ATTORNEY.

Patented Sept. 11, 1934

1,973,575

UNITED STATES PATENT OFFICE 1,973,575

ROAD BAND

Elmer McCormick and John E. Cade, Waterloo, Iowa, assignors to John Deere Tractor Company, Waterloo, Iowa, a corporation of Iowa Application May 13, 1932, Serial No. 611,151

6 Claims. (Cl. 301—39)

Our invention relates to road bands which are adapted to be applied to the wheels of a tractor or other vehicle having grousers or lugs thereon to prevent damage to the highway or field over which the tractor is operated or the vehicle is drawn.

One of the objects of our invention is to provide an improved road band which comprises an endless rim having a smooth continuous tread surface.

Another object of our invention is to provide an endless road band which is adapted to be mounted over the grousers or lugs of the drive wheel and to be supported by the wheel independently of the grousers or lugs on the wheel.

Another object of our invention is to provide an improved attaching means for the road band by which it may be quickly attached to or detached from the wheel without removing the grousers or lugs from the wheel.

Another object is to construct the attaching means in such a manner as to take care of variations in the diameter of the wheel and road band as occur in the manufacture thereof. A particular feature of our improved attaching means is that the adjustment for variations in the diameter of the wheel and road band is provided for without relieving the clamping bolt, which forms a part thereof, from taking a portion of the load under shearing stress.

Other objects and advantages of our invention will be apparent to those skilled in the art after a consideration of the following detailed description, taken in conjunction with the accompanying drawing wherein is shown one embodiment of our invention as applied to a tractor drive wheel.

In the drawing:—

Figure 1:
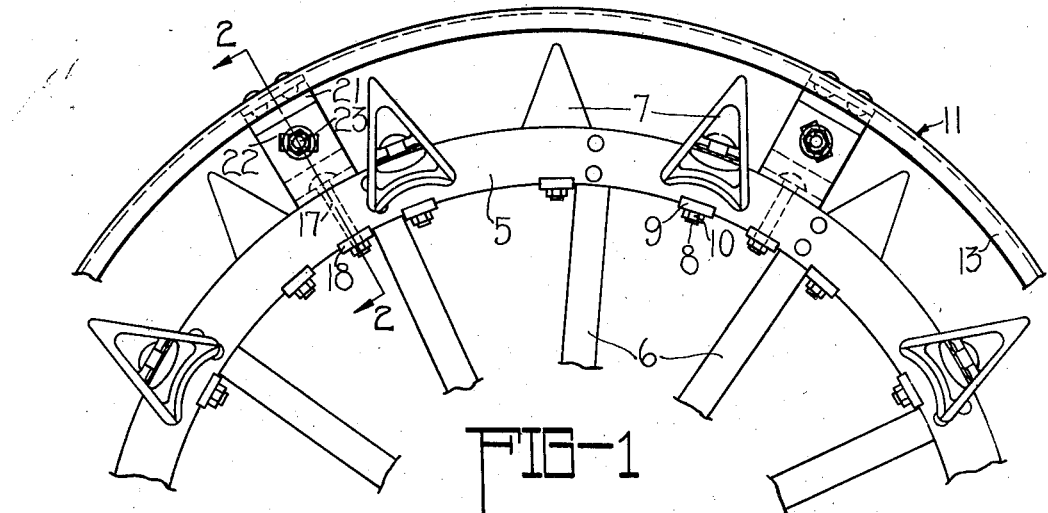
Figure 1 is a fragmentary elevational view of a conventional tractor wheel showing our improved road band secured thereto by means of our improved attaching means.

The tractor wheel in connection with which I have chosen to illustrate my invention is of the open tread type and comprises two spaced parallel rim members 5 and radially extending spokes 6. The outer ends of spokes 6 are secured between rim members 5 and serve also to hold the rim members in spaced relation. A plurality of grousers or traction lugs 7 are spaced around the periphery of rims 5 and are secured thereto by means of bolts 8. The bolts 8 extend inwardly from the lugs and through the space between the rim members 5. A clip 9 and retaining nut 10 are provided on the inner end of each bolt 8 and serve to lock the grouser or lug 7 in the desired position.

The road band comprises an endless circular rim 11 which is formed of a flat stock section disposed in such a manner as to provide a smooth tread surface 12, and having its edges rolled inwardly to form side flanges 13. The road band is supported on the tractor drive wheel by attaching means comprising a plurality of pairs of cooperating supporting brackets 14 and 15 which are secured, respectively, to the circular rim 11 and rim members 5 of the drive wheel. Supporting bracket 14 is securely attached to circular rim 11 by means of rivets 16, and bracket 15 is secured to the rim members 5 by bolt 17. The bolt 17 extends between rim members 5, and a clip 18 and nut 19 are provided on the inner end of each bolt.

An inwardly extending member 21 is formed on bracket 14 and is of sufficient length to overlap an outwardly extending member 22 which is on bracket 15. The members 21 and 22 are clamped together by means of bolt 23 and nut 24. A square neck portion 25 is provided on bolt 23 and is adapted to extend through a square hole 26 formed in member 21 and into a slot 27 formed in member 22. The hole 26 and slot 27 are preferably disposed at an angle between 25° and 35° for a purpose to be presently described.

Figure 3:
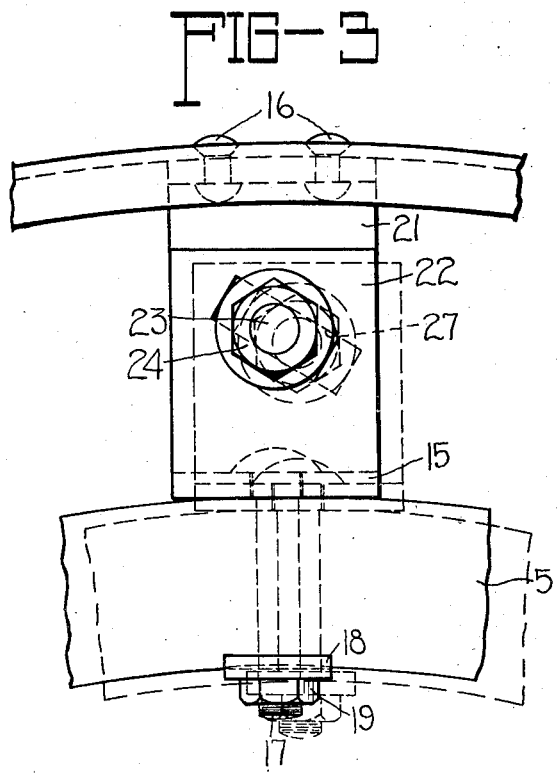
Figure 2:
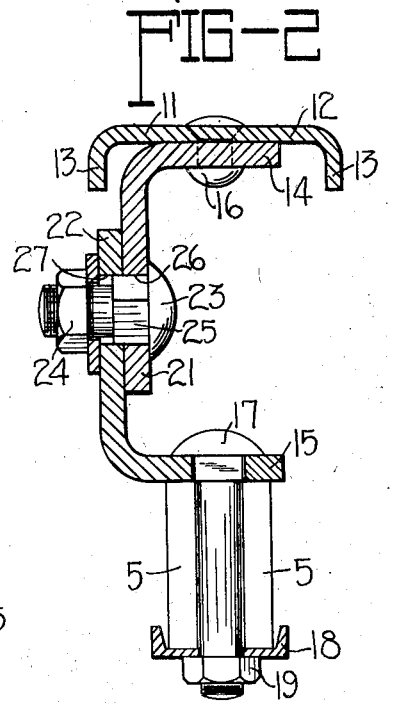
Figure 2 is an enlarged sectional view taken on the plane of line 2—2 of Figure 1 through one of the attaching means; and, Figure 3 is an enlarged elevational view showing one of the attaching means. The two members comprising the attaching means are shown in full lines in one position of adjustment and in dotted lines in another.

Slight variations in the diameter of the circular rim 11 and rim members 5 occur in manufacture and it is therefore desirable to provide an adjustable connection between the supporting brackets 14 and 15 to compensate for these variations. This in the present invention has been provided by the slot 27 in member 22 of bracket 15. By loosening bolt 23 and then shifting bracket 15 inwardly or outwardly, within the limits of the slot 27, the diameter of the area defined by brackets 15 can be increased or decreased. In Figure 3 bracket 15 is shown in full lines in one position relative to bracket 14, and in dotted lines in another. Due to the angle of slot 27, the inward or outward shifting of bracket 15 is at an angle to a radius of the wheel passing through the bracket.

By positioning the slot 27 at an angle relative to the base of bracket 15, and by disposing the hole 27 in member 22 so that two opposite sides thereof are at a corresponding angle, this adjustment is provided for with the bolt 23 still capable of taking a share of the load by being under shearing stress. This, of course, would not be the case if the slot 27 were positioned radially with respect to the wheel. In the latter case, the friction between the two members 21 and 22 would need to be sufficient to carry the entire load. In our improved design, while the bolt 23 may of course be tightened to the point where the friction between members 21 and 22 is sufficient to carry the entire load, it is not necessary that this be done, since any tendency of slippage between these members will be resisted by the bolt 23 being stressed in shear.

If the angle of slot 27 relative to the base of bracket 15 were equal to the angle of repose, the tendency of the load stressing the bolt 23 in shear to cause movement of the bolt along the inclined surface of the slot would be entirely overcome by the friction between the bolt and the inclined surface of the slot. However, since movement of the bolt along the inclined surface of the slot is also resisted by the friction between members 21 and 22, bolt 23 being confined in the square hole in member 21, bolt 23 will be held against movement along the inclined surface of slot 27, even though the angle thereof relative to the base of bracket 15 be considerably greater than the angle of repose, and we prefer to make it so in order to obtain a greater range of adjustment with the same width of bracket 15.

When it is desired to operate the tractor over an improved highway or in a field where damage will result from the traction lugs of the tractor wheel, the road band may be easily and expeditiously mounted over the lugs to provide a smooth tread surface. The brackets 15 are attached to the respective brackets 14 and the nuts 24 are left slightly loose so that bracket 15 may be adjusted slightly after the road band has been mounted on the wheel. The tractor wheel is raised from the ground by means of a jack, and the road band with the brackets 15 thereon is fitted over the wheel. The wheel rim 11 is then shifted, if necessary, to provide uniform clearance between the traction lugs and rim at all points, and by tapping the rim or the brackets 15 with a hammer to bring them into proper position. The bolts 23 and the bolts 17 are then tightened to lock the rim in place.

While we have described, in connection with the accompanying drawing, the specific form in which we prefer to embody our invention, widely different means may be employed in the practice of the broader aspects of our invention.

What we claim, therefore, and desire to secure by Letters Patent is:

1. In combination with a wheel comprising a rim and traction lugs secured on the periphery of the rim, of a road band mounted over the traction lugs and means for securing the road band on said rim, said means comprising a plurality of pairs of overlapping members adapted to be clamped together, one member of each pair being fixed to the band and the other member of each pair being removably connected to said rim, said members being detachably connected and adjustable relatively to each other to compensate for variations in the diameter of said wheel and said road band.

2. In combination with a wheel comprising a rim and traction lugs secured on the periphery of the rim, of a road band mounted over the traction lugs, and means for securing the road band on said rim, said means comprising a plurality of pairs of overlapping members, a bolt for each pair of members adapted to clamp said members together, said bolt being supported in one member, and a slot in the companion member adapted to receive said bolt, said slot permitting relative adjustment of the members to compensate for variations in the diameter of said drive wheel and said road band.

3. In combination with a wheel comprising a rim and traction lugs secured on the periphery of the rim, of a road band mounted over the traction lugs, and means for securing the road band on said rim, said means comprising a plurality of pairs of overlapping members, a bolt for each pair of members adapted to clamp said members together, said bolt being supported in one of the members and a slot in the companion member adapted to receive said bolt and to permit relative adjustment of the members, said slot being disposed at an angle relative to a radius of the wheel passing through the slot.

4. An auxiliary band having attaching means for attaching the band to a wheel, comprising overlapping members, one of which is fixed to the band and the other of which is adapted to be secured to the wheel, and a bolt for securing said members together, one of said members having a hole therein for receiving said bolt and the other of said members having a slot therein through which said bolt may be extended, said slot being positioned at an angle with respect to a radius of said band passing through the slot.

5. An auxiliary band having attaching means for attaching the band to a wheel, comprising overlapping members, one of which is fixed to the band and the other of which is adapted to be secured to the wheel, and a bolt for securing said members together, one of said members having a hole therein for receiving said bolt and the other of said members having a slot therein through which said bolt may be extended, said slot being positioned at an angle with respect to a radius of said band passing through the slot, said angle being such that the friction between said members plus the friction of said bolt upon the inclined surface of said slot is sufficient to overcome the tendency of said bolt to be moved along said surface by the load pressure exerted inwardly upon said band, whereby said bolt is stressed in shear.

6. In combination, a wheel, a road band, means for securing the road band on the wheel comprising a member fixed to the wheel, a second member fixed to the road band and having overlapping engagement with said first member, a bolt for clamping said members together, said bolt being supported in one member, the other member having a slot therein adapted to receive said bolt, said slot permitting relative adjustment of the members to compensate for variations in the diameter of said wheel and said road band, said slot being disposed at an angle relative to a radius of the wheel passing through the slot.

ELMER McCORMICK.
JOHN E. CADE.